Nov. 5, 1968     A. D. HOGAN     3,408,674
SPHERE LAUNCHER

Filed May 8, 1967     2 Sheets-Sheet 1

INVENTOR.
ALFRED D HOGAN
BY
Head & Johnson
ATTORNEYS

Nov. 5, 1968    A. D. HOGAN    3,408,674
SPHERE LAUNCHER
Filed May 8, 1967    2 Sheets-Sheet 2

INVENTOR.
ALFRED D HOGAN
BY
*Head & Johnson*
ATTORNEYS

United States Patent Office 3,408,674
Patented Nov. 5, 1968

3,408,674
SPHERE LAUNCHER
Alfred D. Hogan, Tulsa, Okla., assignor to FWI, Inc.,
Tulsa, Okla., a corporation of Oklahoma
Filed May 8, 1967, Ser. No. 636,798
5 Claims. (Cl. 15—104.06)

ABSTRACT OF THE DISCLOSURE

This invention relates to an improved sphere launcher. The invention provides a device for use in launching spheres, pigs, scratchers and other items into pipelines. The invention provides a body having a passageway of a diameter to freely permit the passage of spheres therethrough, the body having a closed lower recess. A cradle member is supported within the recess about a horizontal shaft and includes forward and rearward normally upstanding leg portions which function to prevent the passage of spheres except when the cradle is pivoted. The improvement of this invention includes an arrangement in which the sphere passing through the launcher is neither raised nor lowered but is supported over the recess in the launcher by rail members. An additional improvement includes the provision wherein the cradle may be rotated 180° to an inverted position in which the launcher provides a full uninterrupted spherical passageway therethrough for launching of pigs, scratchers, and other devices.

Cross-references

This application is not a continuation or division of any existing application. It is, however, an improvement in sphere launchers of the type best illustrated in United States Patent No. 3,266,077.

Summary

Pipelines are commonly used in industry today for transportation of products either in the form of gas or liquids. Frequently pipelines are utilized for transportation of more than one kind of product. For instance, a cross country pipeline may be utilized for transportation of crude oil, gasoline, liquefied petroleum and so forth. In order to prohibit the intermingling of products it has become a practice to utilize spheres to separate one product from another. Spheres are typically formed of rubber, either natural or synthetic, and are usually filled with liquids so that the sphere has approximate the specific gravity of the products being separated. The sphere is configured to have a diameter substantially equal to and slightly less than the internal diameter of the pipe in which it passes. The spheres are positioned in the line and are moved by the flow of fluid through the length of the line and serve as a physical block between one product and another.

In another application the spheres are injected into lines to force out condensates. This is particularly true with regard to gas lines in which water frequently condenses and collects in the lower portions of the line. If the water freezes it may block the line; therefore to prevent the collection water spheres are periodically injected into the line and moved by the flow of gas so that condensate is pushed out.

While spheres have become the basic device for use of separation of products it is occasionally desirable that other devices such as pipeline pigs and scratchers be injected in pipelines. These are usually in the form of cylindrical devices which pass through the line. Scratchers are pigs having wire protrusions which engage the interior of the line to break away incrustations and thereby keep the line clear.

The device utilized for injecting spheres into pipelines is called a sphere launcher. Typically a launcher is utilized in conjunction with an apparatus having a sphere storage barrel. A number of spheres may be placed in the storage barrel to be launched sequentially as desired. Such an apparatus is fully described in detail in Patent No. 3,266,077. Many pipelines are of relatively large diameter and therefore spheres used in such pipelines having the same diameter as the internal diameter of the lines become objects of considerable weight. For this reason it is important that they be carefully handled. An object of this invention is to provide a launcher in which the spheres pass through the launcher without being either raised or lowered by the operation of the launcher mechanism.

In addition, it is desirable that the sphere launching mechanism be utilized as a means for launching pigs, scratchers, and other devices which are usually of a substantially cylindrical rather than a spherical shape. This invention provides a sphere launcher which may, in one position, afford a completely unobstructed passage through the launcher so that pigs, scratchers, and other devices may be freely passed through it.

Description of views

Detailed description

Figure 1:
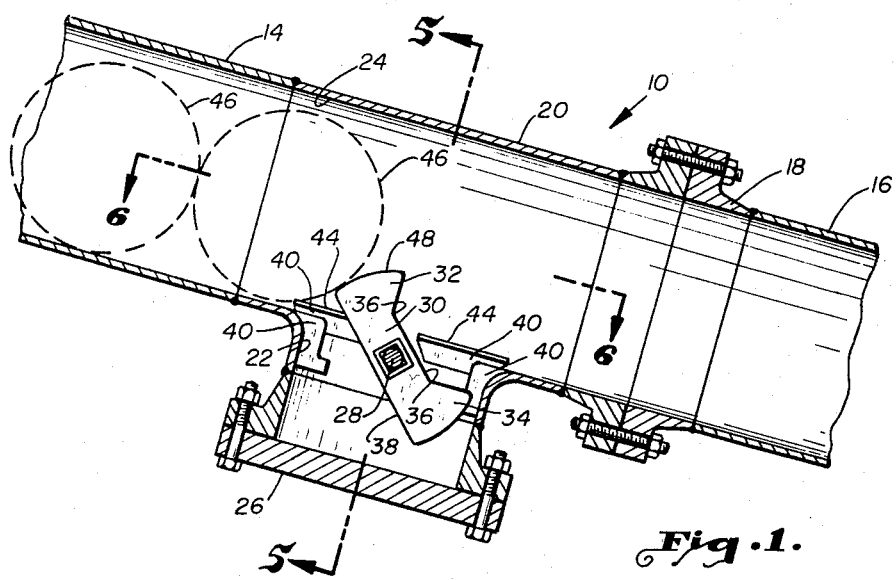
FIGURE 1 is a cross-sectional view of a launcher of this invention. The launcher is shown inclined to the horizontal since this is the attitude in whch the launcher is most frequently used.
Figure 2:
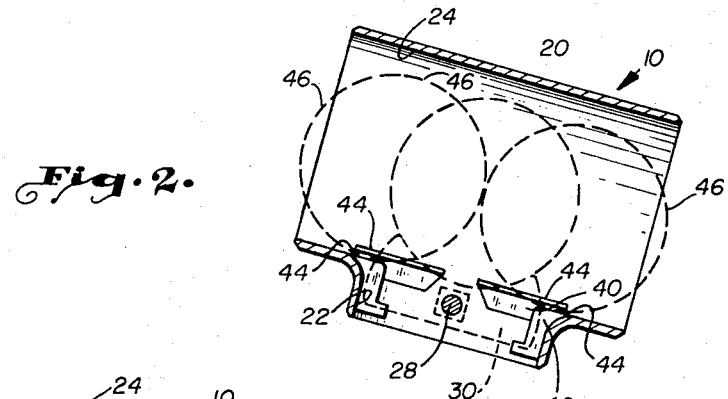
FIGURE 2 is a view of the launcher of this invention showing a sphere in sequential position demonstrating that the sphere is neither raised nor lowered as it passes through the launcher.

Referring now to the drawings and first to FIGURE 1 the improved sphere launcher of this invention is indicated generally by the numeral 10. The launcher is shown in a typical application in which it has affixed, at one end, a sphere storage barrel 14 and is connected at the other end, by means of a length of pipe 16, to a pipeline. A bolted coupling 18 is shown as a means whereby the launcher 10 is connected to the pipe 16, however, this is by way of example only as it may be directly welded to the pipe or connected by a flanged coupling.

The launcher 10 consists basically of a body 20 having a recessed lower portion 22. The body 20 may be typically constructed of a pipe T. The body provides a passageway 24 of a diameter to permit free passage of spheres therethrough and into pipe 16. The lower recess 12 is closed, such as by means of a bolted flange 26.

Positioned within the lower recess 22 and extending in a plane perpendicular the longitudinal axis of the passageway 24 is a horizontal shaft 28. The shaft 28 extends sealably exterior of the launcher (see FIGURE 5).

Figure 3:
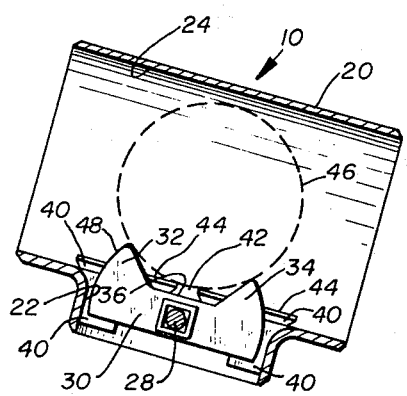
FIGURE 3 is a cross-sectional view as shown in FIGURE 1 showing the cradle in an intermediate position as a sphere is being launched through the mechanism.

Affixed to the shaft 28 is a cradle member 30 having an integral forward leg portion 32 and a rearward leg portion 34. The leg portions 32 and 34 are spaced apart from each other and are normally upstanding as shown in FIGURE 3. The cradle member 30 is pivoted by shaft 28 in a plane parallel the longitudinal axis of the passageway 24.

The cradle 30 includes an upper intermediate support surface 36 between the forward and rearward leg portions 32 and 34. The cradle, in addition, includes a lower surface 38.

Figure 5:
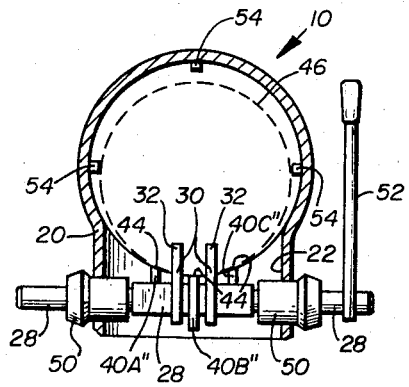
FIGURE 5 is a cross-sectional view taken along the line 5—5 of FIGURE 1.
Figure 6:
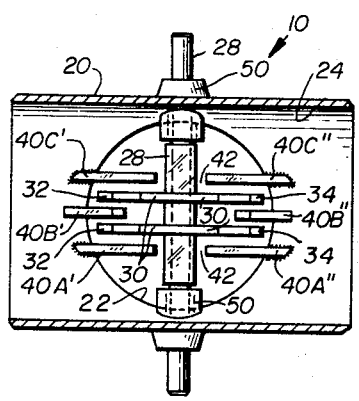
FIGURE 6 is a cross-sectional view taken along the line 6—6 of FIGURE 1.

Cradle 30 may be in the form of a single element but preferably is formed of two substantially identical and parallel elements as shown in FIGURES 5 and 6. Each of the cradle elements in the arrangement of FIGURES 5 and 6 is spaced apart from and parallel to each other and each is affixed to and rotated by shaft 28. The function of the forward and rearward leg portions 32 and 34, the upper support surface 36, and the lower surface 38 of the cradle member 30 will be described in detail subsequently.

A rail member 40 extends at least substantially over the recess lower portion 22 and provides support for the passage of a sphere over the recess. In the illustrated embodiment (see FIGURE 6) three rails are utilized, each formed of two portions. The first rail is designated by 40A' and 40A", the second or center rail by 40B' and 40B", and the second outer rail by 40C' and 40C". While the rails may be formed of a continuous member extending completely across the recess 20 and above the shaft 28, in the illustrated embodiment, in order that the shaft 28 may be located near the exterior peripheral surface of the passageway 24, the rails 40 are each formed of two pieces providing a gap 42 therebetween in which is received the upper portion of the shaft 28. Each of the rail portions are arranged so that the upper surface 44 thereof is in alignment with the lower peripheral surface of passageway 24 through the body 20. The function of the rails 40 are to provide a lower surface for a sphere, indicated by numeral 46, to roll on as it passes over the recess 2.

In the preferred embodiment the cradle 30, or each element thereof if the cradle is formed of multiple elements as is illustrated in FIGURES 5 and 6, has an outer edge 48 of the forward leg portion 32 defined as a segment of a circle having a center coincident with the axis of shaft 28. By this arrangement the spheres 46 are not pushed rearwardly at any time as the cardle is actuated to cause the passage of spheres through the launcher.

As previously stated, the shaft 28 extends sealably exteriorly of the body 10 as shown in FIGURES 5 and 6, such as by means of sealing bearings or bushings 50. Exterior to the body 10 a handle 52 is affixed to the shaft 28 as a means of pivotation of cradle member 30 to cause the passage of spheres through the launcher. Handle 52 affords manual operation of the launcher as an exemplification of one manner by which it may be operated. The launcher may equally as well be actuated by means of hydraulic, pneumatic or electric operated device in various automated systems.

Operations

Figure 4:
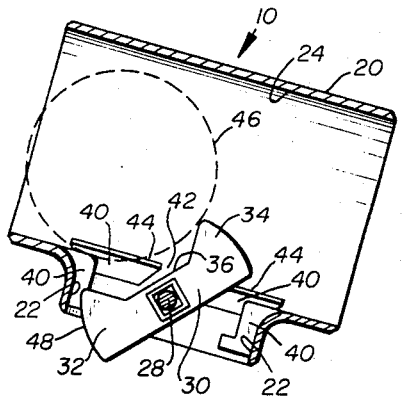
FIGURE 4 is a cross-sectional view showing the cradle in a position to receive a sphere thereon for launching.

The normal position of the cradle member 30 is shown in FIGURE 1. The outer edge 48 of the forward leg portion 32 retains spheres 46 within the storage barrel 14. When it is desired to launch a sphere the cradle member 30 is rotated, such as by means of handle 52, to the position shown in FIGURE 4. In this position the sphere 46 next adjacent the cradle is permitted to move forwardly. In doing so it rolls upon rails 40 as it passes over recess 22 and thereby is not required to change elevation, that is, it is neither raised nor lowered. The cradle 30 is next pivoted by means of rotation of shaft 28 to pass through the intermediate position as shown in FIGURE 3 permitting the sphere to roll on rails 40 over the cradle. It is important to note that as the cradle permits the passage of the sphere 46 the sphere is not carried by the cradle. The weight of the sphere is supported on the rails 40 and the cradle functions only as a gate. As the cradle 30 is continued to be rotated it returns to the position of FIGURE 1, having permitted a sphere 46 to pass over the recess 22 downwardly into the pipe 16.

Figure 7:
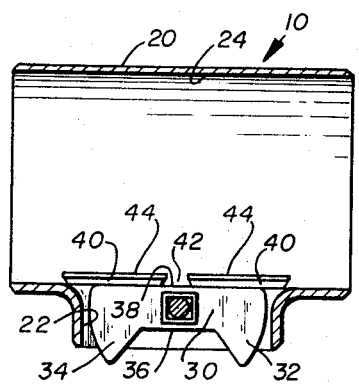
FIGURE 7 is a cross-sectional view as shown in FIGURE 1 but showing the cradle in an operating position wherein an unobstructed passage through the launcher is provided so that the launcher may be utilized for the injection of a pig, scratcher or other non-spherical device into a pipeline.

An additional improvement of this invention is a provision of means whereby the launcher may be positioned to receive the passage of non-spherical members, such as pigs and scratchers therethrough. In this mode of operation the cradle 30 is positioned in a position wherein it is rotated 180° from the intermediate position of FIGURE 3 to the inverted position of FIGURE 7. In the operating position of FIGURE 7 the forward and rearward leg portions 32 and 34 extends downwardly into the body recess 22 and all portions of the cradle member lie below the upper surface 44 of the rail members. In this operating position the passageway 22 is unobstructed permitting the launching of elongated items, such as pigs and scratchers.

This invention has been described in substantial particularity and by means of exemplified embodiments. It is understood, however, that the invention is not limited by the abstract nor the summary of invention provided herein, nor to the exemplified embodiments, but is entitled to the broadest scope of the subject matter of the appended claim or claims including the full equivalency thereof.

What is claimed:

1. A device for launching spheres into a pipeline comprising:
   a body having a passageway of a diameter to permit free passage of spheres therethrough, the body having a closed lower recess intermediate its length, one end of the body being adaptable to receive a sphere storage barrel and the other to connect to a pipeline;
   a horizontal shaft rotatably supported in the body recess below and substantially in a plane perpendicular the passageway, one end of the shaft extending sealably externally of the body,
   at least one rail member extending at least substantially across said lower recess, and in a plane parallel the passageway axis, the upper surface thereof being in alignment with the lower surface of said passageway whereby a sphere may pass through said body over said lower recess without being raised or lowered;
   a cradle member affixed to and pivoted by said shaft within said body, said cradle member having integral forward and rearward spaced apart normally upstanding leg portions, said cradle member being pivotal by said shaft in a plane parallel the passageway axis and being adjacent, parallel to, and spaced from the plane of said rail member, the cradle member being pivotal by said shaft between a first and second operating position, said forward leg portion normally extending toward the end of the body adapted for connection to a storage barrel and said rearward leg portion normally extending toward the end of the body adapted for connection to a pipeline, the cradle member being pivotal to a first operating position wherein said forward upstanding leg portion lies within said recess and below said rail member permitting a sphere to roll onto said rail member and the rearward leg portion extending upwardly into said passageway preventing the sphere from preceding past the cradle, and the cradle being pivotal to a second operating position wherein said rearward upstanding leg portion lies within said recess and below said rail member permitting a sphere to roll on said rail member past said recess and out of said body member, said forward leg portion extending upwardly in said second operating position preventing a sphere from rolling onto said rail member; and a handle means affixed to the shaft externally of the body.

2. A device for launching spheres into a pipeline according to claim 1 wherein the outer edge of said cradle member forward leg portion is arcuately defined substantially as the segment of a circle having the center coincident with the axis of said shaft.

3. A device for launching spheres into a pipeline according to claim 1 wherein said rail member is formed of a co-planar forward and a rearward portion, said forward portion being affixed at the forward end thereof to the forward edge of said body recess and the rearward portion being affixed at the rearward edge thereof to the rearward edge of said body recess, said rail member portions providing a gap therebetween at least partially receiving said horizontal shaft.

4. A device for launching spheres into a pipeline according to claim 1 including a pair of spaced apart rail members each extending in the plane of the passageway axis, said cradle member being pivoted between said spaced rail members.

5. A device for launching spheres into a pipeline according to claim 1 wherein said cradle member is rotatable through 360° and provides a third operating position in which both said forward and rearward leg portions extend downwardly into said body recess, and wherein in such third operating position all portions of said cradle members lie below said rail member affording an unobstructed passageway through said body.

References Cited

UNITED STATES PATENTS 3,266,077    8/1966    Elliott et al. _____ 15—104.06

EDWARD L. ROBERTS, *Primary Examiner.*